(12) United States Patent
Kiraly (10) Patent No.: US 8,532,358 B2
(45) Date of Patent: Sep. 10, 2013

(54) SYSTEM AND METHOD FOR SEGMENTATION OF MR FLOW DATA USING FLUID DYNAMICS AND TRACKING

(75) Inventor: Atilla Peter Kiraly, Plainsboro, NJ (US)

(73) Assignee: Siemens Aktiengesellschaft, München (DE)

( * ) Notice: Subject to any disclaimer, the term of this patent is extended or adjusted under 35 U.S.C. 154(b) by 904 days.

(21) Appl. No.: 12/542,014

(22) Filed: Aug. 17, 2009

(65) Prior Publication Data
US 2010/0014739 A1  Jan. 21, 2010

Related U.S. Application Data

(60) Provisional application No. 61/097,977, filed on Sep. 18, 2008.

(51) Int. Cl.
*G06K 9/00* (2006.01)

(52) U.S. Cl.
USPC .......................... 382/131; 382/130; 600/407

(58) Field of Classification Search
USPC .................................. 382/130, 131; 600/407
See application file for complete search history.

(56) References Cited

U.S. PATENT DOCUMENTS

| | | | |
|---|---|---|---|
| 6,718,193 B2* | 4/2004 | Knoplioch et al. | 600/407 |
| 6,973,212 B2* | 12/2005 | Boykov et al. | 382/173 |
| 8,233,681 B2* | 7/2012 | Aylward et al. | 382/128 |
| 2007/0019846 A1* | 1/2007 | Bullitt et al. | 382/128 |

OTHER PUBLICATIONS

Jan Erik Solem, et al., "Velocity Based Segmentation in Phase Contrast MRI Images," In: MICCAI, France (2004), LNCS 3216, pp. 459-466.
Markus Persson, et al., "Phase Contrast MRI Segmentation Using Velocity and Intensity," 2005.

* cited by examiner

*Primary Examiner* — Claire X Wang
*Assistant Examiner* — Katrina Fujita
(74) *Attorney, Agent, or Firm* — Donald B. Paschburg; F. Chau & Associates, LLC (57) ABSTRACT

Methods for vessel segmentation and tracking using 7D MRI flow image data incorporate information from the velocity field and the magnitude. A vessel tracking methods selects a time containing sufficient blood flow through a vessel, uses the magnitude image to determine the vessel boundary and uses the velocity image to define the vessel direction. A method for segmenting tubular and circular objects segments the objects into separate vessels and then uses the velocity data to reunite the objects, where touching components are evaluated by the velocity field where they are connected. If vectors point towards the other component, the two components are reconnected. An advection-diffusion method based on fluid dynamics performs a fluid dynamics simulation with image forces according to the Navier-Stokes equations. With the 7D data, the vector field is available from the flow data, from the time point at which maximal flow occurs in the vessel of interest.

12 Claims, 5 Drawing Sheets

SYSTEM AND METHOD FOR SEGMENTATION OF MR FLOW DATA USING FLUID DYNAMICS AND TRACKING

CROSS REFERENCE TO RELATED UNITED STATES APPLICATIONS

This application claims priority from "Fluid Dynamics and Tracking approaches for segmentation of MR flow data", U.S. Provisional Application No. 61/097,977 of Atilla Kiraly, filed Sep. 18, 2008, and is a continuation-in-part of U.S. patent application Ser. No. 11/762,993 of Kiraly, et al., entitled "Method For Automatic Separation of Segmented Tubular and Circular Objects", filed on Jun. 14, 2007, and of U.S. patent application Ser. No. 12/496,959 of Kiraly, et al., entitled "A Fluid Dynamics Approach to Image Segmentation", filed on Jul. 2, 2009, the contents of all of which are herein incorporated by reference in their entireties.

TECHNICAL FIELD

This disclosure is directed to methods for vessel segmentation and tracking in 7-dimensional (7D) magnetic resonance (MR) flow images.

DISCUSSION OF THE RELATED ART

Seven-dimensional (7D) images of the chest have become possible through magnetic resonance imaging (MRI) that can capture blood velocity and magnitude through vessels. Each 3D voxel within the image contains anatomical information in the form of a gray level value and a 3D vector indicating the direction and magnitude of movement. All data values are recorded over the time of one or more heart cycles. These additional data can prove invaluable for the segmentation of vasculature in such images.

Segmentation and tracking methods for vessels within medical images typically assume a given anatomical image. The availability of flow magnitude and velocity data offers more robustness in obtaining a segmentation and vessel centerlines. Inconsistencies in gray-levels in MR images along with other factors such as noise and reconstruction artifacts can be problematic for segmentation and vessel tracing. The use of this additional data can help overcome these factors. The flow magnitude image alone can be the basis of a robust rough initial segmentation. Given these additional data, the challenge is how to incorporate it into new or existing segmentation methods such that a good balance is achieved among the data available. The robust segmentation of vasculature within these 7D images forms an important basis for automated analysis methods. Determination of pulmonary hypertension, centerline extraction, are among the methods that could benefit.

Quantifying blood flow is important in diagnosing a number of different heart conditions. Using MRI for this purpose has a number of advantages, as it is non-invasive and does not affect the flow that is being measured. Furthermore, with MRI it is possible to obtain flow measurements in any direction, and can simultaneously measure velocity of blood flow and lumen area, which aids in making accurate flow estimations.

The ability to measure flow with MRI was developed in the 1980's for in vivo use. There are two main groups of techniques for flow measurements with MRI: phase techniques, and time-of-flight (TOF) techniques. Imaging techniques that utilize phase changes are more widely used and include phase contrast (PC) imaging and the less frequently used Fourier velocity imaging.

The basis of magnetic resonance imaging is that when nuclei possessing a half-integer spin are placed inside a magnetic field, their magnetic moments will precess around the axis of the field. The frequency with which they will precess is called their resonance or Larmor frequency. Altering the intensity of the magnetic field will change the rate at which spins precess. The gradients used in MRI are fields with linearly varying intensity that are added to the main magnetic field. Applying a gradient to the field will thus alter the resonance frequency of spins. This means that since nuclei at different positions will experience different fields, they will also precess at different frequencies. The change in frequency will lead to an accumulation of phase, which is dependent on the frequency shift and the time it is applied. It is this phase shift that is utilized in phase contrast MRI to yield information about the motion of nuclei. Since the change in phase is directly dependent on the alteration in frequency, it is dependant on how far spins travel, which is an effect of their velocity.

Phase contrast images are usually obtained using a gradient echo sequence, which results in a sensitivity to dephasing due to inhomogeneity in the magnetic field, so-called $T2^*$-dephasing. To reduce the effects of this dephasing, and other unwanted contributions to the phase, two separate images are acquired, and the phase contrast image is calculated as the difference in phase in these two on a pixel-by-pixel basis. The two images are attained from two consecutive scans, using the same imaging parameters, but different gradient first moments. The change in the gradient first moment between the two scans determines the amount of velocity encoding in the final image. The velocity encoding gradient can be applied to any one axis at a time to create an image sensitive to flow in that particular direction. Applying pulses on two or three axes simultaneously results in flow sensitivity in an oblique direction.

In cardiac phase contrast flow studies, there are three types of MR images:

(1) Phase image: phase reconstruction of the difference signal;

(2) Anatomy (rephased) image: magnitude reconstruction of the flow-compensated signal; and (3) Magnitude image: magnitude reconstruction of the difference signal.

Figure 2:
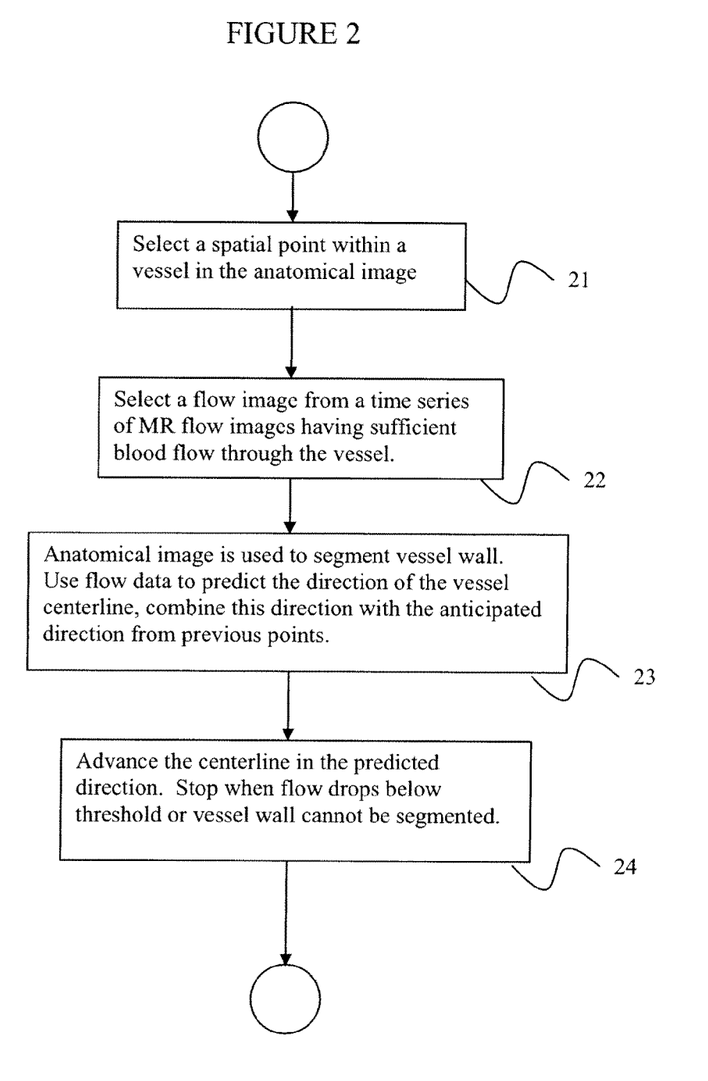
FIG. 2 is a flow chart of a method for vessel centerline tracking, according to an embodiment of the invention.

The quantitative measurement of flow velocity by MR imaging is based on acquiring two types of images: (1) a flow sensitized image, i.e. an image of which the contents are affected by the velocity of moving matter, typically flowing blood; and (2) an image whose contents are not affected by the motion, known as a flow compensated image. The image acquisition process is based on a particular sequence of magnetic gradient and RF pulses. The phase difference of these complex valued images is linearly related to the velocity, and may be set by a user. FIG. 2 illustrates three types of MR images that can be acquired in a cardiac phase contrast flow study, according to an embodiment of the invention. Referring know to the figure, from left to right, are the phase image, the anatomy (rephased) image, and the magnitude image.

SUMMARY OF THE INVENTION

Exemplary embodiments of the invention as described herein generally include methods and systems that take advantage of the velocity and magnitude of the blood flow to allow for improved segmentation of vessels within such images, and can use the time component to obtain an optimal time-point for segmentation. Methods according to an embodiment of the invention for vessel segmentation and tracking are introduced for 7D MRI flow images. These images provide additional data such as time and blood flow direction and magnitude data that can improve vessel tracking and segmentation in such images.

Methods according to an embodiment of the invention include finding the right time point or time points to perform the segmentation as well as the methods to include and balance the velocity, magnitude, and gray level data to achieve the segmentation. Appropriate time locations can ensure sufficient flow through the vessels of interest. Methods according to an embodiment of the invention include incorporating the new data into vessel tracking, tubular component labeling, and an advection-diffusion based segmentation method. Knowledge of the heart cycle, via EKG measurements, may also be incorporated for better anatomical results. Automatic anatomic labeling of such structures is also possible given knowledge of the heart cycle. Segmentation results from one time cycle can be used to attempt segmentations of vessel in another time cycle.

According to an aspect of the invention, there is provided a method for tracking a blood vessel centerline in a digital medical image, the method including selecting a first blood vessel centerline point in an anatomical image, said anatomical image comprising a plurality of intensities associated with a 3-dimensional grid of points, providing a time series of one or more magnetic resonance (MR) flow images and MR magnitude images of said blood vessel, wherein each said flow image for a given time point comprises a plurality of 3-dimensional flow vectors associated with a 3-dimensional grid of points, and each said magnitude image for a given time point comprises a plurality of flow magnitudes associated with said 3-dimensional grid of points, for said centerline point, selecting an MR flow image for a time point wherein a flow magnitude at said centerline point in said MR flow image is a maximum over the time series of images, determining a direction of said centerline in said anatomical image from a direction of a flow vector associated with said centerline point in said flow image, and selecting, in said anatomical image, a new blood vessel centerline point displaced from said first vessel centerline point along said centerline direction.

According to a further aspect of the invention, the method includes determining a vessel boundary in said anatomical image by moving a point in a magnitude image corresponding to said flow image from said centerline point in a direction perpendicular to the centerline direction until there is a sudden drop of the flow magnitude, wherein a corresponding point in the anatomical image is the vessel boundary.

According to a further aspect of the invention, the method includes determining a vessel end point in said anatomical image by comparing a flow magnitude for a corresponding vessel centerline point in said magnitude image with a flow magnitude for a point outside of said vessel, wherein the end point is reached if the flow magnitude of the vessel centerline point is statistically indistinguishable from the flow magnitude of the point outside the vessel.

According to a another aspect of the invention, there is provided a method for segmenting tubular components in a digital medical image, the method including providing a segmented anatomical image of a tubular branching structure, providing at least one image selected from a time series of magnetic resonance (MR) flow images of said tubular branching structure, wherein each said flow image for a given time point comprises a plurality of 3-dimensional flow vectors associated with a 3-dimensional grid of points, separating said segmented tubular branching structure into separate components, using an expected model of a tree branching structure to classifying each component into one of two groups, wherein a first group is an isolated tree component, and a second group is a tree component with additional components, separating components in the second group wherein all separated components are isolated tree components, based on said expected model of a tree branching structure, and reconnecting all components based on said expected model using physical connections and predicted headings of said tree branching structure model, and using an MR flow image, by evaluating touching components at a region in the flow image where said components touch, wherein if flow vectors in one touching component point towards the other component, reconnecting said two components.

According to a further aspect of the invention, if flow vectors in one touching component do not point to the other component, keeping said components, and further comprising repeating said step of evaluating touching components at a region in the flow image where said components touch for all touching components.

According to a further aspect of the invention, the method includes selecting said MR flow image used for evaluating touching components by selecting an MR flow image for a time point wherein a flow magnitude in said tubular branching structure in said MR flow image is a maximum over the time series of images.

According to a further aspect of the invention, separating said segmented tubular branching structure into separate components comprises specifying scale factors comprising a band of radii of interest $[r_1, r_2]$ wherein each point having a radius estimate $r_1 \leq r \leq r_2$ becomes a seed candidate, grouping the seed candidates into a set of n groups based upon physical proximity to each other and their radii estimates, and partitioning the segmented image into different components using said groups and corresponding seed candidates.

According to a further aspect of the invention, the method includes applying a Euclidean distance transform to the segmented image to label each point based upon a distance to a surface of said tubular branching structure to estimate a radius r and centerline likelihood C for each said point.

According to a further aspect of the invention, classifying each component comprises computing a tree structure for each component using a skeletonization-based method, wherein each component is represented as a series of connected branches; estimating branch lengths and angles for each component, wherein complementary angles in branches are analyzed to detect abnormalities; and using branch lengths to identify outliers.

According to a another of the invention, there is provided a method for segmenting a vessel in a digital medical image, the method including providing a digital anatomical image, said anatomical image comprising a plurality of intensities associated with a 3-dimensional grid of points, providing a time series of magnetic resonance (MR) flow images, wherein each said flow image for a given time point comprises a plurality of 3-dimensional flow vectors associated with a 3-dimensional grid of points, selecting one or more seed points at a base of one or more corresponding vessels of interest, wherein said one or more seed points are sources of one or more corresponding diffusive dyes, selecting one or more seed points outside of the vessels wherein said outside points are diffusive dye sinks, calculating a concentration at each image vessel point for each dye by using image features as influences of a diffusion and advection for each dye, wherein said advection is derived from flow vectors for MR flow image points corresponding to said image vessel points in a selected MT flow image, and segmenting the image into one or more vessels based on the calculated dye concentration for the corresponding dye.

According to a further aspect of the invention, the dye concentration is calculated using a Navier-Stokes equation adapted to scale diffusion and advection based on image features, viscosity and diffusion rates.

According to a further aspect of the invention, the adapted Navier-Stokes equation takes the following form:

$$\frac{\partial \rho}{\partial t} = -\exp(-m_{d1}((u \cdot \nabla)I)^2)(u \cdot \nabla)\rho + k\nabla \cdot [\nabla \rho \cdot \exp(-m_{d2}(\nabla I \cdot \nabla I))] + S$$

wherein I represents the image, the vector u represents the flow field derived from the MR flow image, $\rho$ is a dye concentration in a vessel, v is the viscosity of the fluid, k is the diffusion rate of the dye, the vector f represents external forces influencing the flow, the vector s represents external influences to the dye, the terms $m_{v1}$ and $m_{d1}$ control the influence of the image on advection of the fluid and dye, and the terms $m_{v2}$ and $m_{d2}$ control the viscosity and diffusion of the vector field and the diffusion of the dye.

According to a further aspect of the invention, selecting an MR flow image comprises finding a time point image in the time series of images having a maximal flow in a vessel of interest.

According to another aspect of the invention, there is provided a program storage device readable by a computer, tangibly embodying a program of instructions executable by the computer to perform the method steps for tracking a blood vessel centerline in a digital medical image.

According to another aspect of the invention, there is provided a program storage device readable by a computer, tangibly embodying a program of instructions executable by the computer to perform the method steps for segmenting tubular components in a digital medical image.

According to another aspect of the invention, there is provided a program storage device readable by a computer, tangibly embodying a program of instructions executable by the computer to perform the method steps for segmenting a vessel in a digital medical image.

DETAILED DESCRIPTION OF EXEMPLARY EMBODIMENTS

Exemplary embodiments of the invention as described herein generally include systems and methods for vessel segmentation and tracking in 7-dimensional (7D) magnetic resonance (MR) flow images. Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention.

As used herein, the term "image" refers to multi-dimensional data composed of discrete image elements (e.g., pixels for 2-D images and voxels for 3-D images). The image may be, for example, a medical image of a subject collected by computer tomography, magnetic resonance imaging, ultrasound, or any other medical imaging system known to one of skill in the art. The image may also be provided from non-medical contexts, such as, for example, remote sensing systems, electron microscopy, etc. Although an image can be thought of as a function from $R^3$ or $R^7$ to R or, the methods of the inventions are not limited to such images, and can be applied to images of any dimension, e.g., a 2-D picture or a 3-D volume. For a 2- or 3-dimensional image, the domain of the image is typically a 2- or 3-dimensional rectangular array, wherein each pixel or voxel can be addressed with reference to a set of 2 or 3 mutually orthogonal axes. The terms "digital" and "digitized" as used herein will refer to images or volumes, as appropriate, in a digital or digitized format acquired via a digital acquisition system or via conversion from an analog image.

7D MRI scans comprise a series of volumes quickly acquired over time, so that each set of volumes correspond to a specific time point. For each 3D location within a volume, there is a gray-level related to anatomical information as well as a vector. Hence, the vector field is part of the data and no additional effort of any kind is required to obtain the vector field. This vector field is part of the data given from the scanner and is used by methods according to embodiments of the invention to obtain a segmentation. Methods according to embodiments of the invention incorporate the additional information available from the velocity field and the magnitude images defining the flow of blood within the medical image. Knowing the direction and magnitude of the blood flow allows for a more robust segmentation of the individual vessel structures.

As discussed above, phase contrast MRI is based on the property that a uniform motion of tissue in a magnetic field gradient produces a change in the MR signal phase, $\Phi$. This change is proportional to the velocity of the tissue, v. The MR signal from a volume element accumulates the phase $$\Phi(r,t) = \gamma B_0 T + \gamma v \cdot \int G(r,t)t \, dt = \gamma B_0 T + \gamma v \cdot \overline{G},$$

during time T, where $B_0$ is a static magnetic field, $\gamma$ the gyro-magnetic ratio and $G(r, t)$ is the magnetic field gradient. Notice that $\overline{G}$ is exactly the first moment of $G(r, t)$ with respect to time. If the field gradient is altered between two consecutive recordings, then by subtracting the resulting phases $$\Phi_1 - \Phi_2 = \gamma v \cdot (\overline{G}_1 - \overline{G}_2)$$

the velocity in the $(\overline{G}_1 - \overline{G}_2)$-direction is implicitly given. In this way a desired velocity component can be calculated for every volume element simultaneously. To construct the velocity vector in 3D, the natural way is to apply appropriate gradients to produce the x-, y- and z-components respectively. The velocity can be expressed in vector form $v = (v_x, v_y, v_z)^T$, and the velocity magnitude is $|v| = \sqrt{v \cdot v} = \sqrt{v_x^2 + v_y^2 + v_z^2}$.

Figure 1:
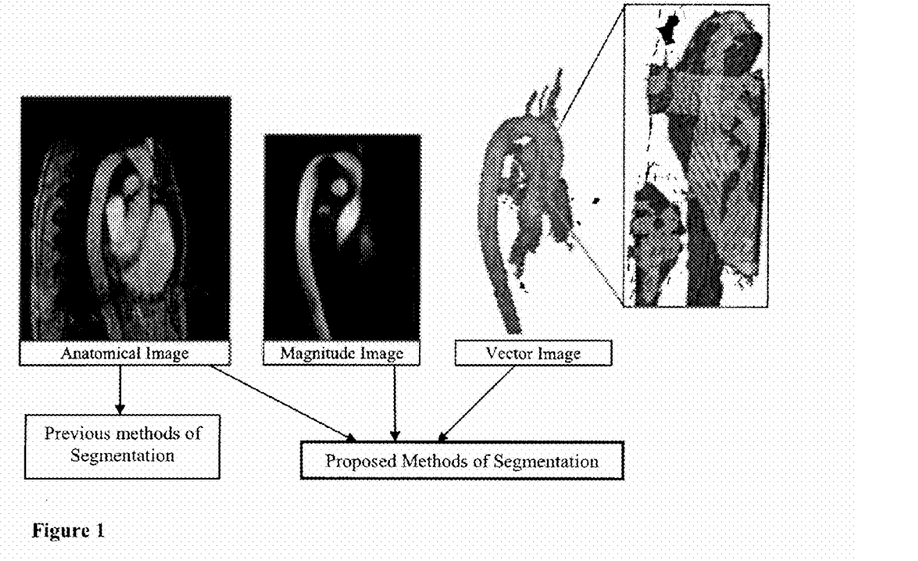
FIG. 1 compares the image inputs assumed by previous methods of vessel segmentation against the new inputs available and used in methods according to embodiments of the invention.

FIG. 1 compares the image inputs assumed by many previous methods of vessel segmentation against the new inputs available and used in methods according to embodiments of the invention. The availability of additional dimensions of data offers increased robustness and/or accuracy in automatic vessel segmentation methods. Previous methods of segmentation had only the anatomical image available, as indicated on the left of the figure. The anatomical image associated a scalar gray level with each voxel. Methods according to embodiments of the invention can use not only the anatomical image data, but also data from the magnitude image, which associates a (scalar) blood flow magnitude with each voxel, and data from the vector image, which associates a 3D vector indicative of blood flow direction with each image voxel.

Since the 7D images are obtained over the course of several heart cycles, flow of sufficient magnitude is not available for every vessel at each point in time. For the vessel of interest, the time or times points at which the flow is maximal offer the most relevant data for segmentation. Once a segmentation is available at a particular time point, segmentation at the remaining time points is possible through registration or assuming certain temporal conditions. In additional, if the heart cycle is known, specific vessels can be anatomically labeled as well.

Vessel Tracking

Vessel tracking methods typically depend only on gray level data available from conventional modalities of imaging. These methods often filter the image and determine local vessel boundaries to step along the vessel and determine its segmentation and centerline simultaneously. Two issues encountered with such methods involve whether the updated direction is correct and whether or not the end of the vessel has been reached.

According to an embodiment of the invention, additional data available from a time series of MRI flow images can be smoothly integrated into existing method, as illustrated in the flow chart of FIG. 2. Referring now to the figure, given a spatial point on a vessel center at step 21, a specific time point image in the series of images may be selected at step 22 that contains sufficient blood flow through the vessel of interest by simply taking the time where the magnitude of the flow at the selected point is maximal within the vessel of interest. The 3D vector image, which is readily available from the MR data, can be used to define the heading of the vessel. Because the blood flows in the direction of the vessel during the strongest portion of the heart cycle, this data can be employed directly to predict the direction of the vessel at step 23. For example, the average vector of a local area around the point can be used as a determined vessel direction. Then, at step 24, the centerline is advanced by displacing the centerline point a small distance in the direction of the vessel.

The magnitude image can be used to determine the vessel boundary more robustly, as the magnitude of the flow of blood within the vessel is larger and more uniform than any flow outside of the vessel, as there is no blood flowing outside of the blood vessel. Given the point of maximal blood flow, one can move a point from a centerline position toward the boundary, i.e. in a direction perpendicular to the centerline direction, until there is a sudden drop of the flow magnitude. The point where the magnitude drops would be the boundary. The end of the vessel would be determined by that point where the blood flow magnitude within the vessel becomes statistically indistinguishable from the flow magnitude outside the vessel.

Tubular Component Segmentation

Figure 3:
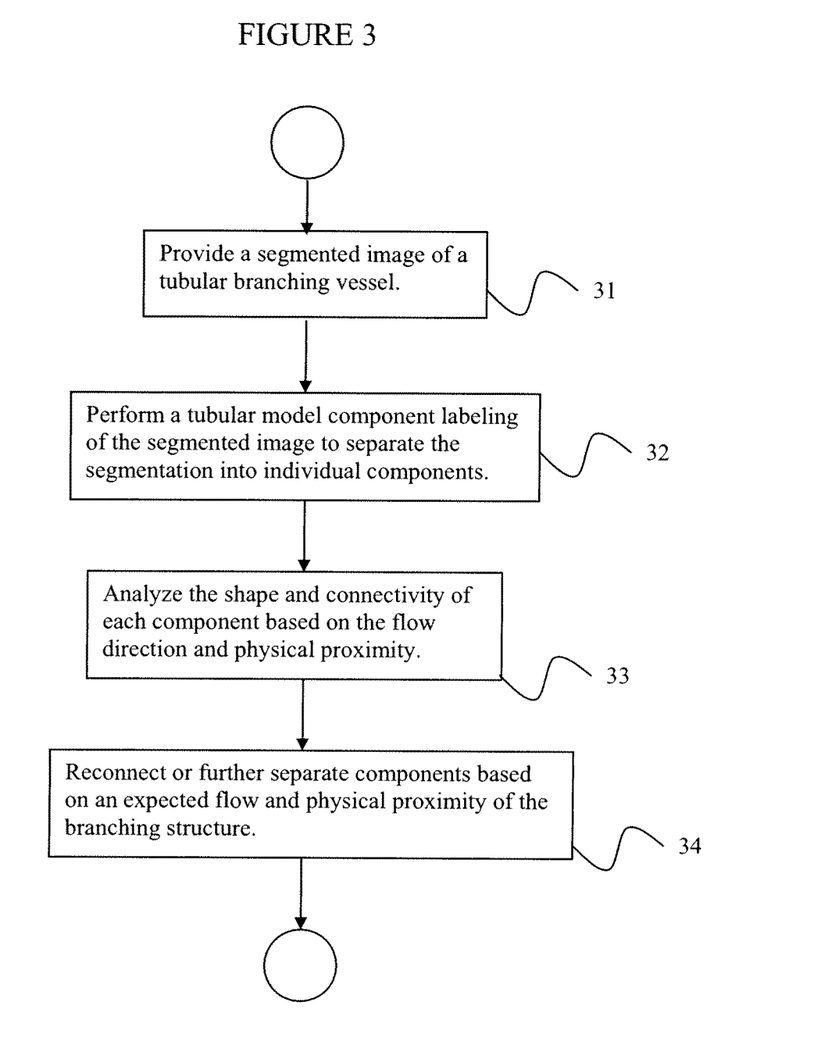
FIG. 3 is a flow chart of a method for separation and reconnection of a tubular branching structure, according to an embodiment of the invention.

A previous invention disclosure of the inventor of the present disclosure, U.S. patent application Ser. No. 11/762,993, entitled "Method For Automatic Separation of Segmented Tubular and Circular Objects", filed on Jun. 14, 2007, the contents of which are herein incorporated by reference in their entirety, described a fully automatic method for segmenting tubular and circular objects. The method includes two operational phases, as illustrated in the flow chart of FIG. 3. Given a segmented image of a tubular branching vessel at step 31, a first phase at step 32 performs a tubular model component labeling of the segmented image. The segmented image, 31, can be formed by thresholding followed by morphological operations such as an opening upon the appropriate time value in the magnitude image can produce a rough initial segmentation for the tubular-model component labeling. The component labeling step separates the segmentation into separate components based upon a tubular model as described in U.S. patent application Ser. No. 11/762,993. Depending upon the proper scale parameters, this step can clearly differentiate larger structures. With a smaller scale, it tends to create many isolated tree-like components. The goal is to disconnect vessels that should not be connected, such as nearby arteries and veins. The first step disconnects many vessels while the second one reconnects vessels that should be connected. The second processing phase operates on the components created by the first phase. The shape and connectivity of each component is analyzed at step 33. Using an expected model of the branching structure each component is either reconnected at step 34 with other components or further separated for reconsideration. The use of specific models of expected anatomy can be used for automatic identification of the arterial and venous trees and can provide improved performance. The use of the flow vector data from the flow image can directly guide which sections should be reconnected.

The tubular model component labeling phase proceeds by first converting the segmented image to a structure that reflects the likelihood of centerlines, C, along with a radius estimate at each point, r. This conversion may make use of only the segmented image or can also depend on the original image data as well. The labeling phase begins by specifying a band of radii of interest (scale parameters) $[r_1, r_2]$. This scale range specifies all points that are seed candidates for core components. Hence each point within the image such that its radius estimate is $r_1 \leq r \leq r_2$ becomes a seed candidate. This step may be implemented according to an embodiment of the invention by applying a Euclidean distance transform to the segmented image data. This transform labels each point based upon its distance to the surface and serves as both the radius estimate and the centerline likelihood.

Next, the candidates are grouped together into a set of n groups based upon their physical proximity and their radii estimates. Depending upon the physical location and the radius estimates, two given seeds are assigned to the same group. If additional seeds also are in close proximity, they will be added to this group as well. If no seeds are grouped together, the total number of groups will be the total number of initial seeds. In the case of all seeds being grouped together, only a single group will result. In practice, the actual number of groups falls in between these two extremes. At this early stage, since the total number of groups n is already known, changes to the scale parameters can be made until the minimum expected number of groups are found. Once the groups and corresponding candidates are determined, they are used to partition the segmented image into different components by competing against each other within the likelihood measure C. Depending upon the scale factors chosen, these could be many components or just several. Competition algorithms known in the art include competitive region growing, fuzzy seeded region growing, level-set methods, fast marching methods, watershed transforms, and any other method that accepts seeds to define regions.

The separation/reconnection and component analysis phase is applied to the output of the previous phase. Multiple components are given as input. Each component is classified into one of two possible groups. The first group is a normal isolated tree component. The second group is a tree component with additional components such as extraneous segmentation noise or other tree structures. The expected model helps classify each component into these two categories.

Next, components in the second grouping are further separated to ensure all components are only isolated portions of the tree. This separation is done based on the expected model of the tree branching structure.

All components are then reconnected based upon what is expected with the given model. Physical connections and predicted headings of the tree structures are used to determine if two components should be connected or considered separate. The end result is separate tree segmentations along with an elimination of false positive artifacts not consistent with the expected model.

In an embodiment of the invention, a tree structure is computed for each component via a skeletonization-based method. This describes the component as a series of connected branches and allows an estimate of the branch lengths and angles. Given the tree structure, complementary angles in branches are analyzed to detect abnormalities. Branch angles that are less than 90 degrees are suspicious for elimination or separation. In this case, the task is greatly simplified since a component is simpler than a sub-tree. The requirement of angles greater than a specified amount is one way to introduce an expected model into this phase. In addition, since the components are only small sections of the entire tree, branch lengths can be used to identify outliers. Once each component is properly isolated, the physical connectivity between the components coupled with the branch headings can determine if the two components should be connected. The radius estimate can also play a role in this decision. If the estimated radii are similar and beyond a certain threshold, the connection should be made. Given additional information such as a known artery and vein can help further discriminate between the two tree structures.

Figure 4:
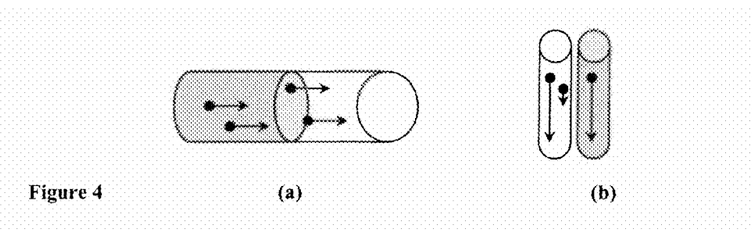
FIGS. 4(a)-(b) illustrate a reconnection phase making use of the flow field to decide if two separate components should be reconnected, according to embodiments of the invention.

The use of additional data is immediately possible for the reconnection phase. The vector flow field at the edges of the segmented component, which may split a single vessel, for an appropriate time, can be used to decide if to components can be reconnected. Touching components are evaluated by the vector field at the region where they are connected. If the vectors point towards the other component, the two components can be reconnected. If the vectors of one component do not point to another component, the components should be kept separate. The process is repeated for all touching components.

FIGS. 4(a)-(b) illustrate the reconnection phase described above making use of the flow field to decide if two separate components should be reconnected. These components are then either kept separate or reconnected. FIG. 4(a) illustrates a case where reconnection should take place, and FIG. 4(b) illustrates a case where the two components should remain separated.

Advection-Diffusion Segmentation

A previous invention disclosure of the inventor of the present disclosure, U.S. patent application Ser. No. 12/496,959 entitled "A Fluid Dynamics Approach to Image Segmentation", filed on Jul. 2, 2009, the contents of which are herein incorporated by reference in their entirety, discloses an image segmentation method based on a fluid dynamics advection-diffusion method that simulates a physical process of diffusion of a dye through a fluid. An image and user input is used to influence the advection and diffusion of the fluid and the dye. The dye concentration is used to determine the regions segmented. A flow field that influences the diffusion process through advection. The flow field can either be static during the process or be dynamically evolving during the diffusion of the dye. Different boundary conditions can be used depending upon the application. A steady state is then either found or the simulation is stopped after a predetermined period of time.

One or more seed points representing dye sources may then be selected from within the image data for each region of segmentation. The seed points may either be automatically selected or user-defined. Where the seed points are user-defined, the user may optionally also provide one or more advection influences in the form of directions. The user may provide at least one seed point for each region of segmentation, and each provided seed point may include an advection influence, as desired. The vector field for advection may be obtained directly from the imaging modality, as is the case for flow MRI images. Seeds marked as being not the part of the segmentation are also placed. These seeds act as dye sinks, or locations that absorb the dye. The final concentrations of dye throughout the image are used to determine the segmented regions.

The flow field for the image along with dye diffusion may be calculated/modeled based on the Navier-Stokes equations or other fluid dynamics modeling equations, using the provided advection influences. However, this step is not necessary since a vector field is directly available from the imaging modality. The Navier-Stokes equations for incompressible flow are given by the following equations:

$$\frac{\partial u}{\partial t} = -(u \cdot \nabla)u + v\nabla^2 u + f \tag{1}$$

$$\frac{\partial \rho}{\partial t} = -(u \cdot \nabla)\rho + \kappa \nabla^2 \rho + S \tag{2}$$

These equations update a flow field, u, and a dye concentration ρ through the region p. v controls the viscosity of the fluid and the K is the diffusion rate of the dye. If K has a low value, the dye is carried through the fluid rather than being diffused. f represents any external forces influencing the flow. Similarly, S represents external influences to the dye such as sources.

To apply these equations to an image to obtain a meaningful segmentation, dye sources and sinks, fluid flow sources and drains (which are not used in this case), and image influences should be taken into account. Dye and flows sources and sinks/drains are already present with the f and S terms. However, the equations should be modified to account for image influences. These influences play a role in both the changes in the fluid components as well as the diffusion process.

Let $I: \mathfrak{R}^d \to \mathfrak{R}$ be an image where $d \in \{2,3\}$ be a two or three dimensional image. An image influence factor is applied that is based on the magnitude of differences between two locations of the image such that the greater the dissimilarity between the two locations, the more resistance to diffusion and advection is present. According to an embodiment of the invention, an exponential of a scaled negative square of the differences is used:

$$\frac{\partial u}{\partial t} = -\exp(-m_{v1}((u \cdot \nabla)I)^2)(u \cdot \nabla)u + \qquad (3)$$
$$v\nabla \left[\nabla u \cdot \text{diag}(\exp(-m_{v2}(\nabla I \cdot \nabla I)))\right] + f$$

$$\frac{\partial \rho}{\partial t} = \qquad (4)$$
$$-\exp(-m_{d1}((u \cdot \nabla)I)^2)(u \cdot \nabla)\rho + \kappa\nabla \cdot \left[\nabla \rho \cdot \exp(-m_{d2}(\nabla I \cdot \nabla I))\right] + S$$

where ● in the exponential is a point-wise multiplication. In EQS. (3) and (4), there is an exponential function scaling the diffusion and advection based upon the given image I. Both v and K still control the viscosity and diffusion rate, but there are four additional terms, $m_{v1}$, $m_{v2}$, $m_{d1}$, and $m_{d2}$. $m_{v1}$ and $m_{d1}$ control the influence of the image on advection of the fluid and the dye. Larger values result in reduced advection in regions of strong edges in the image. The viscosity, or diffusion of the vector field and the diffusion of dye is controlled by $m_{v2}$ and $m_{d2}$ with similar reductions occurring. Setting any one of these parameters to zero removes the image influence for that component. Note that by setting all four of the new parameters to zero, EQS. (3) and (4) reduce to the original EQS. (1) and (2).

These equations can determine a density distribution and flow with a given image and flow sources and sinks. The simulation updates the flow vector field and density field to arrive at a steady state or after a predetermined period of time.

Given an image I and seed points and flows, a segmentation according to an embodiment of the invention can be determined as follows. At least two different labels should be given, each containing at least one seed point. Flow locations or jets may also be defined automatically. They can be associated with individual labels, groups of labels, or all labels. Alternatively, an entire static flow field can be given instead of flow locations.

EQS. (3) and (4) can determine a final state of diffusion with the given parameters. However, several states must be determined for the number of labels. Let L be the number of labels given, then either L−1 or L diffusion states are determined to obtain a final segmentation. The first label may be referred to as the background label.

Focusing now on a single label, a specific label l∈L is taken as a source of dye while the remaining labels are considered sinks. In addition, specific flows assigned to the label or a static flow field specific to the label is applied. EQS. (3) and (4) are applied until a steady state is reached or until a predetermined period of time has elapsed. The result is a density field for a particular label. Since the flow field is already given from the MR flow data, only equation (4) needs to be solved. Also, one can either solve EQS. (3) and (4) simultaneously or solve (3) first to determine a static flow field and then apply only Equation (4). If a stable flow field is achievable, then this later two-step method is preferable.

The above process yields several density maps $\rho_i$, i∈{1, . . . , L−1} or $\rho_i$, i∈{1, . . . , L} depending upon whether a density map is computed for the background label. The label given to a particular location in the image is based on the label with the highest density at that location. In the case of L−1 labels, the background label is applied to a region with low densities for any remaining labels. It is also possible to label regions as undecided where densities of approximately the same magnitude are present.

One issue with this method is the appropriate definition of the velocity field u from which to perform the advection. With the 7D data, the vector field is directly available from which the segmentation can be performed. In this case velocity field u will be taken from the time point at which maximal flow occurs in the vessel of interest. Therefore, u will be fixed and only EQ. 4 is employed.

Figure 5:
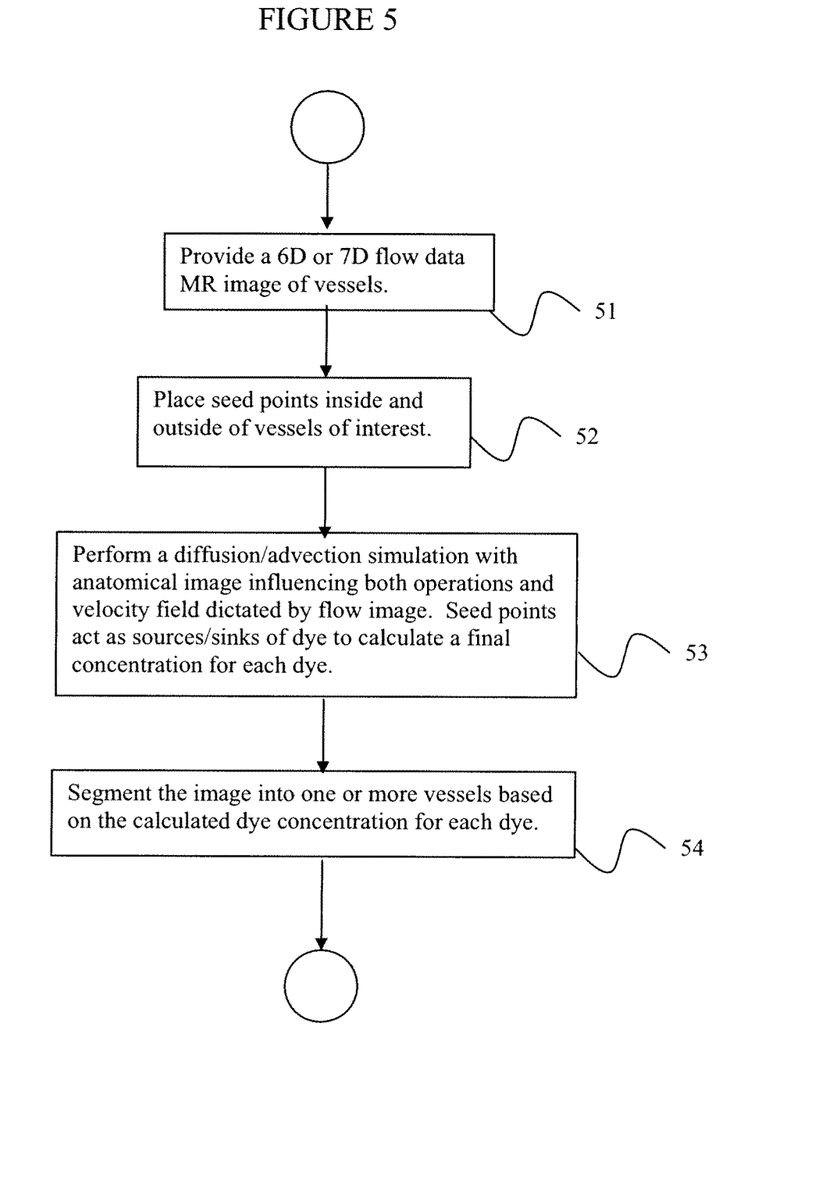
FIG. 5 is a flow chart of a method for segmenting tubular structures, according to an embodiment of the invention.

FIG. 5 is a flow chart of a method for segmenting tubular structures according to an embodiment of the invention. Given an unsegmented anatomical image at step 51, the seed points should be placed at the base or end of the vessels of interest at step 52, with the velocity field inverted if necessary. At step 53, the Navier Stokes concentration equation is forward integrated to calculate a concentration for each dye using image features as influences of a diffusion and advection for each dye. The advection is derived from flow vectors for MR flow image points in the selected MT flow image. At step 54, after a steady state has been reached, or after a predetermined number of integration steps, the image is segmented into one or more vessels based on the calculated dye concentration for the corresponding dye. Separation of different vessels and background regions is possible through the flow field. It is possible to obtain the results over several flow fields to reach the final segmentation. The method inherently separates vessels of different seeds based upon both the gray level and flow field information. Even with weak flow fields, the gray level information is capable of guiding the segmentation. In addition, the opposite situation is also possible, in which the flow field guides the segmentation when the gray level information is weak.

Automatic seed placement, such as that disclosed above with regard to Tubular Component Segmentation, can be used to obtain different segmented components that can later be combined by a tubular component segmentation method according to an embodiment of the invention described above.

System Implementations

It is to be understood that embodiments of the present invention can be implemented in various forms of hardware, software, firmware, special purpose processes, or a combination thereof. In one embodiment, an embodiment of the present invention can be implemented in software as an application program tangible embodied on a computer readable program storage device. The application program can be uploaded to, and executed by, a machine comprising any suitable architecture.

Figure 6:
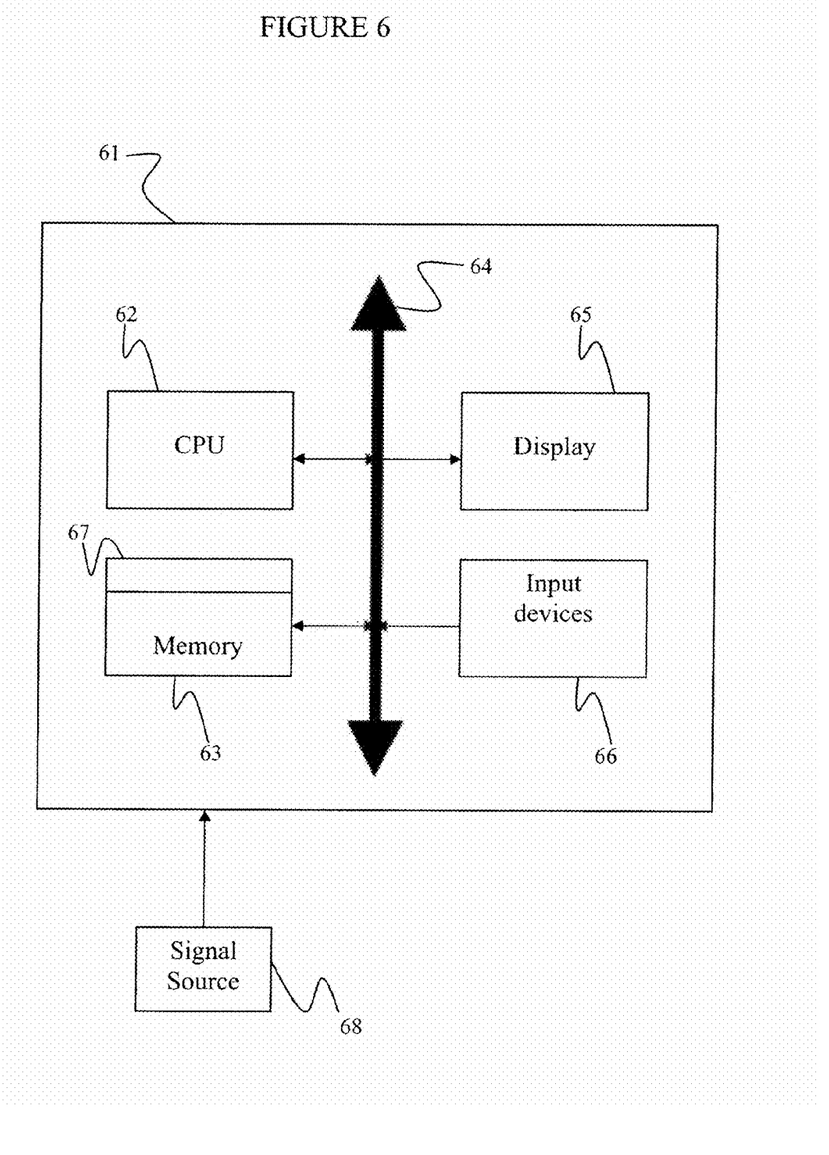
FIG. 6 is a block diagram of an exemplary computer system for implementing a method for vessel segmentation and tracking using magnetic resonance (MR) flow images, according to an embodiment of the invention.

FIG. 6 is a block diagram of an exemplary computer system for implementing methods for vessel segmentation and tracking using magnetic resonance (MR) flow images, according to an embodiment of the invention. Referring now to FIG. 6, a computer system 61 for implementing the present invention can comprise, inter alia, a central processing unit (CPU) 62, a memory 63 and an input/output (I/O) interface 64. The computer system 61 is generally coupled through the I/O interface 64 to a display 65 and various input devices 66 such as a mouse and a keyboard. The support circuits can include circuits such as cache, power supplies, clock circuits, and a communication bus. The memory 63 can include random access memory (RAM), read only memory (ROM), disk drive, tape drive, etc., or a combinations thereof. The present invention can be implemented as a routine 67 that is stored in memory 63 and executed by the CPU 62 to process the signal from the signal source 68. As such, the computer system 61 is a general purpose computer system that becomes a specific purpose computer system when executing the routine 67 of the present invention.

The computer system 61 also includes an operating system and micro instruction code. The various processes and functions described herein can either be part of the micro instruction code or part of the application program (or combination thereof) which is executed via the operating system. In addition, various other peripheral devices can be connected to the computer platform such as an additional data storage device and a printing device.

It is to be further understood that, because some of the constituent system components and method steps depicted in the accompanying figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

While the present invention has been described in detail with reference to a preferred embodiment, those skilled in the art will appreciate that various modifications and substitutions can be made thereto without departing from the spirit and scope of the invention as set forth in the appended claims.

What is claimed is:

1. A computer implemented method for segmenting tubular components in a digital medical image, the method performed by the computer comprising the steps of:

providing a segmented anatomical image of a tubular branching structure;

providing at least one image selected from a time series of magnetic resonance (MR) flow images of said tubular branching structure, wherein each said flow image for a given time point comprises a plurality of 3-dimensional flow vectors associated with a 3-dimensional grid of points;

separating said segmented tubular branching structure into separate components;

using an expected model of a tree branching structure to classifying each component into one of two groups, wherein a first group is an isolated tree component, and a second group is a tree component with additional components;

separating components in the second group wherein all separated components are isolated tree components, based on said expected model of a tree branching structure; and reconnecting all components based on said expected model using physical connections and predicted headings of said tree branching structure model, and using an MR flow image, by evaluating touching components at a region in the flow image where said components touch, wherein if flow vectors in one touching component point towards the other component, reconnecting said two components.

2. The method of claim 1, wherein if flow vectors in one touching component do not point to the other component, keeping said components, and further comprising repeating said step of evaluating touching components at a region in the flow image where said components touch for all touching components.

3. The method of claim 1, further comprising selecting said MR flow image used for evaluating touching components by selecting an MR flow image for a time point wherein a flow magnitude in said tubular branching structure in said MR flow image is a maximum over the time series of images.

4. The method of claim 1, wherein separating said segmented tubular branching structure into separate components comprises:

specifying scale factors comprising a band of radii of interest $[r_1, r_2]$ wherein each point having a radius estimate $r_1 \leq r \leq r_2$ becomes a seed candidate;

grouping the seed candidates into a set of n groups based upon physical proximity to each other and their radii estimates;

partitioning the segmented image into different components using said groups and corresponding seed candidates.

5. The method of claim 4, further comprising applying a Euclidean distance transform to the segmented image to label each point based upon a distance to a surface of said tubular branching structure to estimate a radius r and centerline likelihood C for each said point.

6. The method of claim 1, wherein classifying each component comprises computing a tree structure for each component using a skeletonization-based method, wherein each component is represented as a series of connected branches; estimating branch lengths and angles for each component, wherein complementary angles in branches are analyzed to detect abnormalities; and using branch lengths to identify outliers.

7. A program storage device readable by a computer, tangibly embodying a program of instructions executable by the computer to perform the method steps for segmenting tubular components in a digital medical image, the method comprising the steps of:

providing a segmented anatomical image of a tubular branching structure;

providing at least one image selected from a time series of magnetic resonance (MR) flow images of said tubular branching structure, wherein each said flow image for a given time point comprises a plurality of 3-dimensional flow vectors associated with a 3-dimensional grid of points;

separating said segmented tubular branching structure into separate components;

using an expected model of a tree branching structure to classifying each component into one of two groups, wherein a first group is an isolated tree component, and a second group is a tree component with additional components;

separating components in the second group wherein all separated components are isolated tree components, based on said expected model of a tree branching structure; and reconnecting all components based on said expected model using physical connections and predicted headings of said tree branching structure model, and using an MR flow image, by evaluating touching components at a region in the flow image where said components touch, wherein if flow vectors in one touching component point towards the other component, reconnecting said two components.

8. The computer readable program storage device of claim 7, wherein if flow vectors in one touching component do not point to the other component, keeping said components, and further comprising repeating said step of evaluating touching components at a region in the flow image where said components touch for all touching components.

9. The computer readable program storage device of claim 7, the method further comprising selecting said MR flow image used for evaluating touching components by selecting an MR flow image for a time point wherein a flow magnitude in said tubular branching structure in said MR flow image is a maximum over the time series of images.

10. The computer readable program storage device of claim 7, wherein separating said segmented tubular branching structure into separate components comprises:

specifying scale factors comprising a band of radii of interest $[r_1, r_2]$ wherein each point having a radius estimate $r_1 \leq r \leq r_2$ becomes a seed candidate;

grouping the seed candidates into a set of n groups based upon physical proximity to each other and their radii estimates;

partitioning the segmented image into different components using said groups and corresponding seed candidates.

11. The computer readable program storage device of claim 10, the method further comprising applying a Euclidean distance transform to the segmented image to label each point based upon a distance to a surface of said tubular branching structure to estimate a radius r and centerline likelihood C for each said point.

12. The computer readable program storage device of claim 7, wherein classifying each component comprises computing a tree structure for each component using a skeletonization-based method, wherein each component is represented as a series of connected branches; estimating branch lengths and angles for each component, wherein complementary angles in branches are analyzed to detect abnormalities; and using branch lengths to identify outliers.

* * * * *